United States Patent [19]

Volkert et al.

[11] Patent Number: 5,300,534

[45] Date of Patent: Apr. 5, 1994

[54] PRODUCTION OF PLASTIC FOAMS, PREFERABLY RIGID FOAMS CONTAINING URETHANE GROUPS OR URETHANE AND ISOCYANURATE GROUPS, AND BLOWING AGENT-CONTAINING EMULSIONS FOR THIS PURPOSE

[75] Inventors: Otto Volkert, Weisenheim, Fed. Rep. of Germany; Corinne A. Meynard, Clichy, France

[73] Assignee: BASF Aktiengesellschaft, Ludwigshafen, Fed. Rep. of Germany

[21] Appl. No.: 986,747

[22] Filed: Dec. 8, 1992

Related U.S. Application Data

[62] Division of Ser. No. 904,919, Jun. 26, 1992, Pat. No. 5,205,956.

[30] Foreign Application Priority Data

Jun. 27, 1991 [DE] Fed. Rep. of Germany ....... 4121161

[51] Int. Cl.$^5$ .................................................. C08J 9/14
[52] U.S. Cl. ..................................... 521/98; 521/131; 521/910
[58] Field of Search ........................... 521/131, 98, 910

[56] References Cited

U.S. PATENT DOCUMENTS 4,931,482 6/1990 Lamberts ............................ 521/131
4,945,119 7/1990 Smits ................................... 521/131

Primary Examiner—Morton Foelak
Attorney, Agent, or Firm—Keil & Weinkauf

[57] ABSTRACT

A process for the production of plastic foams, preferably rigid foams containing urethane groups or urethane and isocyanurate groups, by reacting a) an organic and/or modified organic polyisocyanate with b) at least one relatively high-molecular-weight compound containing at least two reactive hydrogen atoms, and, if desired, c) a low-molecular-weight chain extender and/or crosslinking agent, in the presence of d) a blowing agent, e) a catalyst and, if desired, f) assistants and/or additives, in which the blowing agent (d) used is at least one vinylfluoroalkane of the formula $CH_2{=}CH{-}C_nF_{2n+1}$ in which n is an integer from 1 to 6, (di), or a mixture of at least one such vinylfluoroalkane (di) and at least one further physical and/or chemical blowing agent (dii) which is different from (di), blowing agent-containing emulsions which contain at least one vinylfluoroalkane and at least one starting component (a), (b), (c) or (b) and (c) and said plastic foams containing at least one vinylfluoroalkane as insulating gas.

2 Claims, No Drawings

PRODUCTION OF PLASTIC FOAMS, PREFERABLY RIGID FOAMS CONTAINING URETHANE GROUPS OR URETHANE AND ISOCYANURATE GROUPS, AND BLOWING AGENT-CONTAINING EMULSIONS FOR THIS PURPOSE

This is a division of application Ser. No. 07/904,919, filed Jun. 26, 1992, now U.S. Pat. No. 5,205,956.

The present invention relates to a process for the production of plastic foams, preferably rigid foams containing urethane groups or urethane and isocyanurate groups, by reacting the starting components (a), (b) and, if desired, (c), where the blowing agent employed is at least one vinylfluoroalkane of the formula $$CH_2=CH-C_nF_{2n+1}$$

in which n is an integer from 1 to 6, (di), or a mixture comprising at least one such vinylfluoroalkane (di) and at least one further physical and/or chemical blowing agent (dii) which is different from (di), and to blowing agent-containing emulsions which contain at least one vinylfluoroalkane (di) or a mixture of (di) with at least one other blowing agent (dii) and at least one of the starting components (a), (b) or (c) or (b) and (c), and to plastic foams containing said vinylfluoroalkane as insulating gases.

Chlorofluorocarbons (CFCs) such as fluorotrichloromethane (CFC 11), dichlorodifluoromethane (CFC 12) and 1,1,2-trichloro-1,2,2-trifluoroethane (CFC 113) are at present the blowing agents and insulating gases most widely employed for the manufacture of all kinds of plastic foams intended for insulation, in particular closed-cell foams, especially polyurethane or polyisocyanurate foams, extruded polystyrene and polyethylene foams, phenolic foams, poly(vinyl chloride) foams, etc.

CFCs 11 and 12 are also employed for the manufacture of polyolefin foams such as polyethylene and polypropylene, polystyrene or poly(vinyl chloride), more especially intended for packaging.

However, CFCs 11, 12 and 113 are included amongst fully halogenated chlorofluorocarbons which, because of their high chemical stability, are suspected of attacking or degrading stratospheric ozone and whose use is envisaged to be prohibited at the end of this century.

As a solution to this problem it is currently envisaged to replace the CFCs by chlorofluorohydrocarbons containing at least one hydrogen atom, such as chlorodifluoromethane (HCFC 22), 1,1-dichloro-2,2,2-trifluoroethane (HCFC 123), 1-chloro-1,2,2,2-tetrafluoroethane (HCFC 124), 1,1-dichloro-1-fluoroethane (HCFC 241b) and 1-chloro-1,1-difluoroethane (HCFC 142b). Although the HCFCs exhibit ozone-depletion potentials (O.D.P.) which are markedly lower than those of the CFCs, their O.D.P. is nevertheless not zero and their substitution for the CFCs can therefore represent only a temporary solution.

There is therefore still a need for compounds which have no destructive effect on stratospheric ozone (O.D.P.=0) and exhibit properties which are similar to those of CFCs 11, 12 and 113, in order to replace the latter as blowing agents and insulating gases in the manufacture of plastic foams.

It has now been found that this problem can be solved by employing vinylfluoroalkane of formula:

$$CH_2=CH-C_nF_{2n+1}$$

in which $C_nF_{2n+1}$ denotes a linear or branched perfluoroalkyl radical and n is an integer from 1 to 6. These compounds have ODP of zero; the properties of the preferred compounds are illustrated by the following table.

| PROPERTIES | $C_nF_{2n+1}$ | | |
|---|---|---|---|
| | $(CF_3)_2CF$ | $C_4F_9$ | $C_5F_{13}$ |
| Boiling point (°C.) | 31 | 59 | 105 |
| Vapour thermal conductivity at 10° C. (mW/m K) | 9.2 | 8.1 | 5.7 |
| Vapour pressure at 10° C. (mbar) | 445 | 137 | 143 |

The present invention therefore relates to the use of at least one of said vinylfluoroalkanes as blowing agent and insulating gas in the production of plastic foams.

The vinylfluoroalkane of formula $CH_2=CH-C_nF_{2n+1}$ can be obtained industrially by processes which are known per se, for example by a two-stage process consisting successively in:
the addition of ethylene to the corresponding perfluoroalkyl iodide $C_nF_{2n+1}$ in the presence of a catalyst based on copper and ethanolamine, and
the dehydroiodination of the iodide $C_nF_{2n+1}-CH_2CH_2I$ thus obtained, in the presence of alcoholic potassium hydroxide.

The blowing agent most widely employed at present for the manufacture of polystyrene and poly(vinyl chloride) foams is CFC 12. This compound is preferably replaced here by a vinylfuoroalkane whose perfluoroalkyl radical $C_nF_{2n+1}$ contains from 1 to 3 carbon atoms, for example vinylperfluoroisopropane.

The main blowing agents currently employed for the production of polyolefin foams (polyethylene, polypropylene) are CFCs 11 and 12, employed by themselves or mixed with 1,2-dichloro-1,1,2,2-tetrafluoroethane (CFC 114) or with hydrocarbons. CFC 11 is preferably replaced here by a vinylfluoroalkane in which the radical $C_nF_{2n+1}$ contains from 3 to 6 carbon atoms, for example vinyl-perfluoro-n-butane, and CFC 12 is preferably replaced by a vinylfluoroalkane in which this radical $C_nF_{2n+1}$ contains from 1 to 3 carbon atoms, for example vinyl-fluoroisopropane. In this application the vinylfluoroalkanes according to the invention can be employed by themselves, mixed with each other or mixed with alkanes (for example butane); the proportion by weight of the secondary blowing agent in such a mixture may range up to 90%.

The main blowing agents currently employed for the production of phenolic foams are CFCs 11 and 113, employed by themselves or mixed. CFCs 11 and 113 are preferably replaced here by vinylfluoroalkane in which the radical $C_nF_{2n+1}$ contains from 3 to 6 carbon atoms, for example vinylperfluoro-n-hexane. In this application the vinylperfluoroalkanes according to the invention can be employed by themselves, mixed with each other or mixed with alkanes, which may be halogenated, for example pentane, butane, perfluoropentane or 1,1-dichloro-1-fluoroethane; the proportion of alkane, which may be halogenated in such a mixture may range up to 90% by weight.

The processes for the production of polystyrene or PVC foams, polyolefin foams and phenolic foams are well known and do not need to be described here, since it suffices to replace the usual blowing agent (CFC 11, 12 or 113) with a compound of formula (I) or a mixture of such compounds. The molar quantity of compound(s) of formula (I) to be used is substantially the same as that of the blowing agent which they (it) replace(s).

The production of foams containing urethane groups (abbreviated to PU foams below) with a very wide variety of mechanical properties by reacting relatively high-molecular-weight polyhydroxyl compounds and, if desired, low-molecular-weight chain extenders or cross-linking agents with organic polyisocyanates in the presence of catalysts, blowing agents and, if desired, assistants and/or additives is known and is described in numerous patents and other publications. An appropriate choice of the starting components allows soft and elastic, semirigid or rigid PU foams to be produced by this process.

Neither is the production of foams containing bonded urethane and isocyanurate groups new. In this process, organic polyisocyanates are partially cyclized and polymerized in the presence of catalysts, and the resultant polyisocyanates containing isocyanurate groups (PIR) are then reacted with polyhydroxyl compounds in the presence of PU catalysts and blowing agents. In another procedure, the organic polyisocyanates are simultaneously partially cyclized in the presence of substoichiometric amounts of polyhydroxyl compounds, catalysts with various actions and blowing agents, and the polyhydroxyl compounds are added onto the resultant unmodified polyisocyanates containing isocyanurate groups.

A review on the production of rigid PU foams and PU-PIR foams is published, for example, in the monograph by J. H. Saunders and K. C. Frisch, High Polymers, Volume XVI, Polyurethanes, Parts 1 and 2, Interscience Publishers, 1962 and 1964 respectively, and the Kunststoff-Handbuch, Volume VII, Polyurethane, CarlHanser-Verlag, Munich, 1st edition, 1966, and 2nd edition, 1983.

Also known is the use of rigid PU or PU-PIR foams of this type for the production of composite or sandwich elements, which are usually built up from a rigid foam and at least one, preferably two, outer layers comprising a rigid or elastic material, e.g. paper, plastic films, metal sheeting, glass nonwoven, chipboard, inter alia, and the foam-filling of cavities in domestic appliances, such as cooling equipment, for example refrigerators or chest freezers, or hot-water storage tanks, with rigid foams of this type as thermal insulators.

Blowing agents used worldwide on a large scale for the production of heat- and cold-insulating rigid PU or PU-PIR foams are chlorofluoroalkanes, preferably trichlorofluoromethane. The only disadvantage of these blowing gases is environmental pollution, since they are suspected of participating in the depletion of the ozone layer in the stratosphere.

In order to reduce the amount of chlorofluoroalkanes, the blowing gas used is predominantly water, which reacts with the polyisocyanate to form carbon dioxide, which acts as the actual blowing agent. Rigid PU foam formulations of this type have the disadvantage of a high consumption of polyisocyanate merely for the reaction of the water to form the carbon dioxide. A further disadvantage is an impairment in the heat-insulation properties due to the relatively high thermal conductivity of the carbon dioxide compared with chlorofluoroalkanes.

According to EP-A-351 614, the blowing agents used may furthermore be fluorinated hydrocarbons, perfluorinated hydrocarbons, sulfur hexafluoride or mixtures of at least two of these compounds. Since these fluorinated or perfluorinated blowing agents are only sparingly soluble or insoluble in the starting components for the production of the polyisocyanate polyaddition products, they are emulsified in at least one organic and/or modified organic polyisocyanate, in at least one relatively high-molecular-weight compound containing at least two reactive hydrogen atoms or in a mixture of at least one relatively high-molecular-weight compound containing at least two reactive hydrogen atoms and a low-molecular-weight chain extender and/or crosslinking agent. This method allows cellular plastics having a uniform and fine cell structure to be produced, but has the disadvantage of the narrow choice of suitable fluorinated or perfluorinated compounds having a boiling point in the required boiling point range, and the high price of these blowing agents. In order to obtain cellular plastics having the technically desired cell structure, the choice is restricted to mixtures of perfluoropentane and perfluorohexane. A further disadvantage is that blowing agents of this type are relatively resistant chemically, are degraded only slowly in the atmosphere and can therefore contribute to global warming.

Low-boiling hydrocarbons which can be used as blowing agents are soluble in the starting components for the production of the polyisocyanate polyaddition products and give foams having a very coarse, frequently nonuniform cell structure and increased thermal conductivity.

The mechanism of foam formation in the production of polyisocyanate polyaddition products and the effect of surface-active assistants based on siloxane-oxyalkylene copolymers on this reaction has been described by B. Kanner et al. (J. of Cellular Plastics, January 1969, pages 32 to 39).

It is an object of the present invention to replace all or at least some of the chlorofluorocarbons known as blowing agents for the production of rigid PU or PU-PIR foams by other, environmentally friendly blowing agents without adversely affecting the fine-celled foam structure, as can be achieved using emulsions based on fluorinated hydrocarbons.

We have found that, surprisingly, this object is achieved by using fluorinated olefins as the blowing agent.

The present invention accordingly provides a process for the production of plastic foams, which comprises using at least one vinylfluoroalkane of the formula $CH_2=CH-C_nF_{2n+1}$ in which $-C_nF_{2n+1}$ is linear or branched perfluoroalkyl and n is an integer from 1 to 6, as blowing agent and/or insulating gas, with the proviso that, if the vinylfluoroalkane is vinylperfluoro-n-butane, it is not employed in admixture with dichloroethylene or in admixture with more than 90% of 1,1-dichloro-1-fluoroethane.

The present invention preferably provides a process for the production of rigid foams containing urethane groups or urethane and isocyanurate groups, by reacting a) an organic and/or modified organic polyisocyanate with b) at least one relatively high-molecular-weight compound containing at least two reactive hydrogen atoms, and, if desired, c) a low-molecular-weight chain extender and/or crosslinking agent, in the presence of d) a blowing agent, e) a catalyst and, if desired, f) assistants and/or additives, wherein the blowing agent (d) used is at least one vinylfluoroalkane of the formula $$CH_2=CH-C_nF_{2n+1}$$

in which n is an integer from 1 to 6, with the proviso that, if the vinylfluoroalkane is vinylperfluoro-n-butane, it is not employed in admixture with dichloroethylene or in admixture with more than 90% of 1,1-dichloro-1-fluoroethane.

The present invention furthermore provides blowing agent-containing emulsions which contain at least one vinylfluoroalkane of the formula $$CH_2=CH-C_nF_{2n+1}$$

in which n is an integer from 1 to 6, (di), and at least one organic and/or modified organic polyisocyanate (a) or at least one relatively high-molecular-weight compound containing at least two reactive hydrogen atoms (b), or at least one low-molecular-weight chain extender and/or crosslinking agent (c), or a mixture of (b) and (c).

Since the vinylfluoroalkanes (di) which can be used according to the invention are only sparingly soluble or essentially insoluble, in the necessary amounts, in the starting components (a), (b) and, if used, (c) or in mixtures of at least two of these starting components, they are expediently emulsified in at least one of the starting components, for example in (a), (b) or (c), or in a mixture of (b) and (c) or (a) and in a mixture of (b) and (c), and used in the form of emulsions for the production of the rigid foams.

In contrast to highly fluorinated or perfluorinated, low-boiling alkanes, the vinylfluoroalkanes of the formula $CH_2=CH-C_nF_{2n+1}$ which can be used according to the invention react very readily with hydroxyl free radicals and are therefore degraded in the lower atmosphere. It is furthermore advantageous that the vinylfluoroalkane-containing emulsions and the reaction mixtures formed therefrom flow very readily. The molds, in particular those having spatial shapes which are difficult to fill, can be filled more rapidly and more uniformly, so that moldings of homogeneous cell structure and low densities can be produced without difficulties. The rigid PU or PU-PIR foams produced by the process according to the invention in open or closed molds are fine-celled and have low thermal conductivity.

The rigid PU or PU-PIR foams are prepared by the process according to the invention using, with the exception of blowing agent (d), the starting components which are known per se, to which the following details apply.

Suitable organic polyisocyanates (a) are conventional aliphatic, cycloaliphatic, araliphatic and preferably aromatic polyisocyanates.

The following may be mentioned as examples: alkylene diisocyanates having from 4 to 12 carbon atoms in the alkylene moiety, such as 1,12-dodecane diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate; cycloaliphatic diisocyanates, such as cyclohexane 1,3- and 1,4-diisocyanate and any desired mixtures of these isomers, 1-isocyanato-3,3,5-trimethyl-5-isocyanatomethylcyclohexane (isophorone diisocyanate), 2,4-and 2,6-hexahydrotolylene diisocyanate and the corresponding isomer mixtures, 4,4'-, 2,2'- and 2,4'-dicyclohexylmethane diisocyanate and the corresponding isomer mixtures, and preferably aromatic diisocyanates and polyisocyanates, e.g. 2,4- and 2,6-tolylene diisocyanate and the corresponding isomer mixtures, 4,4'-, 2,4'- and 2,2'-diphenylmethane diisocyanate and the corresponding isomer mixtures, mixtures of 4,4'- and 2,4'-diphenylmethane diisocyanates, polyphenyl-polymethylene polyisocyanates, mixtures of 4,4'-, 2,4'- and 2,2'-diphenylmethane diisocyanates and polyphenyl-polymethylene polyisocyanates (crude MDI), and mixtures of crude MDI and tolylene diisocyanates. The organic diisocyanates and polyisocyanates may be employed individually or in the form of mixtures.

Frequently, modified polyisocyanates are also used, i.e. products which are obtained by partial chemical reaction of organic diisocyanates and/or polyisocyanates. Specific examples are ester-, urea-, biuret-, allophanate-, carbodiimide-, isocyanurate- and/or urethane-containing diisocyanates and/or polyisocyanates. Individual examples are urethane-containing organic, preferably aromatic, polyisocyanates containing from 33.6 to 15% by weight, preferably from 31 to 21% by weight, of NCO, based on the total weight, for example 4,4'-diphenylmethane diisocyanate, or 2,4- or 2,6-tolylene diisocyanate modified by means of low-molecular-weight diols, triols, dialkylene glycols, trialkylene glycols or polyoxyalkylene glycols having molecular weights of up to 1500, specific examples of di- and polyoxyalkylene glycols, which can be employed individually or as mixtures, being diethylene glycol, dipropylene glycol, polyoxyethylene glycol or triol, polyoxypropylene glycol or triol and polyoxypropylenepolyoxyethylene glycol or triol. NCO-containing prepolymers containing from 25 to 9% by weight, preferably from 21 to 14% by weight, of NCO, based on the total weight, and prepared from the polyester- and/or preferably polyether-polyols described below and 4,4'-diphenylmethane diisocyanate, mixtures of 2,4'- and 4,4'-diphenylmethane diisocyanate, 2,4- and/or 2,6-tolylene diisocyanates or crude MDI are also suitable. Furthermore, liquid polyisocyanates containing carbodiimide groups and/or isocyanu-rate rings and containing from 33.6 to 15% by weight, preferably from 31 to 21% by weight, of NCO, based on the total weight, e.g. based on 4,4'-, 2,4'- and/or 2,2'-diphenylmethane diisocyanate and/or 2,4- and/or 2,6-tolylene diisocyanate, have also proven successful.

The modified polyisocyanates, if desired, may be mixed with one another or with unmodified organic polyisocyanates, e.g. 2,4'- or 4,4'-diphenylmethane diisocyanate, crude MDI or 2,4- and/or 2,6-tolylene diisocyanate.

Organic polyisocyanates which have proven particularly successful and are therefore preferred for use for the production of rigid PU foams are mixtures of tolylene diisocyanates and crude MDI or mixtures of modified urethane-containing organic polyisocyanates containing from 33.6 to 15% by weight of NCO, in particular based on tolylene diisocyanates, 4,4'-diphenylmethane diisocyanate, diphenylmethane diisocyanate isomer mixtures or crude MDI, in particular crude MDI having a diphenylmethane diisocyanate isomer content of from 30 to 80% by weight, preferably from 30 to 55% by weight.

The relatively high-molecular-weight compound (b) containing at least two reactive hydrogen atoms is preferably a polyhydroxyl compound having a functionality of from 2 to 8, preferably from 3 to 8, and a hydroxyl number of from 150 to 850, preferably from 200 to 600.

Examples which may be mentioned are polythioether-polyols, polyester-amides, hydroxyl-containing polyacetals and hydroxyl-containing aliphatic polycarbonates and preferably polyester-polyols and polyether-polyols. Also used are mixtures of at least two of the said polyhydroxyl compounds, so long as they have a mean hydroxyl number within the abovementioned range.

Suitable polyester-polyols may be prepared, for example, from organic dicarboxylic acids having from 2 to 12 carbon atoms, preferably aliphatic dicarboxylic acids having from 4 to 6 carbon atoms, and polyhydric alcohols, preferably diols, having from 2 to 12 carbon atoms, preferably from 2 to 6 carbon atoms. Examples of suitable dicarboxylic acids are succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids may be used either individually or mixed with one another. The free dicarboxylic acids may also be replaced by the corresponding dicarboxylic acid derivatives, for example dicarboxylic acid mono- or diesters of alcohols having from 1 to 4 carbon atoms or dicarboxylic anhydrides. Preference is given to dicarboxylic acid mixtures comprising succinic acid, glutaric acid and adipic acid in ratios of, for example, from 20 to 35:35 to 50:20 to 32 parts by weight, and in particular adipic acid. Examples of dihydric and polyhydric alcohols, in particular diols, are ethanediol, diethylene glycol, 1,2- and 1,3-propanediol, dipropylene glycol, 1,4-butanediol, 1,5-pentanediol, 1,6-hexanediol, 1,10decanediol, glycerol and trimethylolpropane. Preference is given to ethanediol, diethylene glycol, 1,4-butanediol, 1,5-pentanediol, 1,6-hexanediol and mixtures of at least two of said diols, in particular mixtures of 1,4-butanediol, 1,5-pentanediol and 1,6-hexanediol. Furthermore, polyester-polyols made from lactones, e.g. $\epsilon$-caprolactone, or hydroxycarboxylic acids, e.g. $\omega$-hydroxycaproic acid, may also be employed.

The polyester-polyols may be prepared by polycondensing the organic, e.g. aromatic and preferably aliphatic polycarboxylic acids and/or derivatives thereof and polyhydric alcohols without using a catalyst or preferably in the presence of an esterification catalyst, expediently in an inert gas atmosphere, e.g. nitrogen, carbon dioxide, helium, argon, inter alia, in the melt at from 150° to 250° C., preferably from 180° to 220° C., at atmospheric pressure or under reduced pressure until the desired acid number, which is advantageously less than 10, preferably less than 2, is reached. In a preferred embodiment, the esterification mixture is polycondensed at the abovementioned temperatures under atmospheric pressure and subsequently under a pressure of less than 500 mbar, preferably from 50 to 150 mbar, until an acid number of from 80 to 30, preferably from 40 to 30, has been reached. Examples of suitable esterification catalysts are iron, cadmium, cobalt, lead, zinc, antimony, magnesium, titanium and tin catalysts in the form of metals, metal oxides or metal salts. However, the polycondensation may also be carried out in the liquid phase in the presence of diluents and/or entrainers, e.g. benzene, toluene, xylene or chlorobenzene, for removal of the water of condensation by azeotropic distillation.

The polyester-polyols are advantageously prepared by polycondensing the organic polycarboxylic acids and/or derivatives thereof with polyhydric alcohols in a molar ratio of from 1:1 to 1.8, preferably from 1:1.05 to 1.2.

The polyester-polyols obtained preferably have a functionality of from 2 to 3, and a hydroxyl number of from 150 to 400, in particular from 200 to 300.

However, the preferred polyhydroxyl compounds are polyether-polyols prepared by conventional processes, for example by anionic polymerization using alkali metal hydroxides, such as sodium hydroxide or potassium hydroxide, or alkali metal alkoxides, such as sodium methoxide, sodium ethoxide, potassium ethoxide or potassium isopropoxide as catalysts and using at least one initiator molecule containing from 2 to 8, preferably from 3 to 8, bonded reactive hydrogen atoms, or by cationic polymerization using Lewis acids, such as antimony pentachloride, boron fluoride etherate, inter alia, or bleaching earth as catalysts, from one or more alkylene oxides having from 2 to 4 carbon atoms in the alkylene moiety.

Examples of suitable alkylene oxides are tetrahydrofuran, 1,3-propylene oxide, 1,2- and 2,3-butylene oxide, styrene oxide and preferably ethylene oxide and 1,2-propylene oxide. The alkylene oxides may be used individually, alternately one after the other or as mixtures. Examples of suitable initiator molecules are water, organic dicarboxylic acids, such as succinic acid, adipic acid, phthalic acid and terephthalic acid, aliphatic and aromatic, unsubstituted or N-mono-, N,N- and N,N'-dialkyl-substituted diamines having from 1 to 4 carbon atoms in the alkyl moiety, such as unsubstituted or mono- or dialkyl-substituted ethylenediamine, diethylenetriamine, triethylenetetramine, 1,3-propylenediamine, 1,3- and 1,4-butylenediamine, 1,2-, 1,3-, 1,4-, 1,5- and 1,6-hexamethylenediamine, phenylenediamines, 2,3-, 2,4- and 2,6-tolylenediamine and 4,4'-, 2,4'- and 2,2'-diaminodiphenylmethane.

Other suitable initiator molecules are alkanolamines, e.g. ethanolamine, diethanolamine, N-methyl- and N-ethyl-ethanolamine, N-methyl- and N-ethyl-diethanolamine, and triethanolamine, and ammonia. Preference is given to polyhydric alcohols, e.g. dihydric or in particular trihydric and/or polyhydric alcohols, such as ethanediol, 1,2- and 1,3-propanediol, diethylene glycol, dipropylene glycol, 1,4-butanediol, 1,6-hexanediol, glycerol, trimethylolpropane, pentaerythritol, sorbitol and sucrose.

The polyether-polyols preferably have a functionality of from 3 to 8, in particular from 3 to 6, and hydroxyl numbers of from 200 to 850, in particular from 300 to 600.

Other suitable polyether-polyols are the melamine/-polyether-polyol dispersions of EP-A-23 987 (U.S. Pat. No. 4,293,657), the polymer/polyether-polyol dispersions prepared from polyepoxides and epoxy resin curing agents in the presence of polyether-polyols in accordance with DE-A-29 43 689 (U.S. Pat. No. 4,305,861), the dispersions of aromatic polyesters in polyhydroxyl compounds of EP-A-62 204 (U.S. Pat. No. 4,435,537) or DE-A-33 00 474, the dispersions of organic and/or inorganic fillers in polyhydroxyl compounds of EP-A-11 751 (U.S. Pat. No. 4,243,755), the polyurea/polyether-polyol dispersions of DE-A-31 25 402, the tris(hydroxyalkyl) isocyanurate/polyether-polyol dispersions of EP-A-136 571 (U.S. Pat. No. 4,514,526) and the crystallite suspensions of DE-A-33 42 176 and DE-A-33 42 177 (U.S. Pat. No. 4,560,708); the information given in said patents should be regarded as part of the description of the present application.

Like the polyester-polyols, the polyether-polyols can be used individually or in the form of mixtures. Furthermore, they may be mixed with the abovementioned dispersions, suspensions or polyester-polyols and the hydroxyl-containing polyester-amides, polyacetals and/or polycarbonates.

Examples of suitable hydroxyl-containing polyacetals are the compounds which can be prepared from glycols, such as diethylene glycol, triethylene glycol, 4,4'-dihydroxyethoxydiphenyldimethylmethane, hexanediol and formaldehyde. Suitable polyacetals can also be prepared by polymerizing cyclic acetals.

Suitable hydroxyl-containing polycarbonates are those of a conventional type, which can be prepared, for example, by reacting diols, such as 1,3-propanediol, 1,4-butanediol and/or 1,6-hexanediol, diethylene glycol, triethylene glycol or tetraethylene glycol, with diaryl carbonates, e.g. diphenyl carbonate, or phosgene.

The polyester-amides include, for example, the predominantly linear condensates obtained from polybasic, saturated and/or unsaturated carboxylic acids or anhydrides thereof and amino alcohols, or mixtures of polyhydric alcohols and amino alcohols and/or polyamines.

Polyhydroxyl compounds which have proven particularly successful and are therefore preferred are mixtures expediently containing, based on 100 parts by weight,
bi) from 0 to 95 parts by weight, preferably from 20 to 80 parts by weight, of a sucrose-initiated polyether-polyol having a hydroxyl number of from 300 to 500, preferably from 350 to 450, based on 1,2-propylene oxide or 1,2-propylene oxide and ethylene oxide,
bii) from 0 to 15 parts by weight, preferably from 5 to 15 parts by weight, of a sorbitol-initiated polyether-polyol having a hydroxyl number of from 400 to 600, preferably from 450 to 550, based on 1,2-propylene oxide or 1,2-propylene oxide and ethylene oxide,
biii) from 0 to 20 parts by weight, preferably from 5 to 15 parts by weight, of an ethylenediamine-initiated polyether-polyol having a hydroxyl number of from 700 to 850, preferably from 750 to 800, based on 1,2-propylene oxide, and
biiii) from 0 to 60 parts by weight, preferably from 5 to 40 parts by weight, of a polyether-polyol having a hydroxyl number of from 400 to 600, preferably from 450 to 550, based on 1,2-propylene oxide or 1,2-propylene oxide and ethylene oxide and prepared using a mixture of sucrose and triethanolamine in a weight ratio of from 1:2 to 2:1 as initiator molecules.

The rigid PU or PU-PIR foams may be prepared with or without the use of chain extenders and/or crosslinking agents (c). However, it may prove advantageous, in order to modify the mechanical properties, to add chain extenders, crosslinking agents or, if desired, mixtures thereof. The chain extenders and/or crosslinking agents used are preferably alkanolamines, in particular diols and/or triols, having a molecular weight of less than 400, preferably from 60 to 300. Examples are alkanolamines, e.g. trialkanolamines such as triethanolamine, triisopropanolamine and products of the addition reaction of ethylene oxide or 1,2-propylene oxide and alkylenediamines having from 2 to 6 carbon atoms in the alkylene moiety, e.g. N,N,N',N'-tetra(2-hydroxypropyl)ethylenediamine, and N,N,N',N'-tetra(2-hydroxypropyl)-ethylenediamine, aliphatic, cycloaliphatic and/or araliphatic diols having from 2 to 14 carbon atoms, preferably from 4 to 10 carbon atoms, e.g. ethylene glycol, 1,3-propanediol, 1,10-decanediol, o-, m- and p-dihydroxycyclohexane, diethylene glycol, dipropylene glycol and preferably 1,4-butanediol, 1,6-hexanediol and bis(2-hydroxyethyl)hydroquinone, triols, such as 1,2,4- and 1,3,5-trihydroxycyclohexane, glycerol and trimethylolpropane, and low-molecular-weight hydroxyl-containing polyalkylene oxides, based on ethylene oxide and/or 1,2-propylene oxide and aromatic diamines, e.g. tolylenediamines and/or diaminodiphenylmethanes, and the abovementioned alkanolamines, diols and/or triols as initiator molecules.

The amount of chain extender, crosslinking agent or mixture thereof used, if any, for the production of the rigid PU or PU-PIR foams is expediently from 0 to 20% by weight, preferably from 2 to 8% by weight, based on the weight of the polyhydroxyl compound.

The blowing agent (d) used for the production of the rigid PU or PU-PIR foam is according to the invention a vinylfluoroalkane of the formula $$CH_2=CH-C_nF_{2n+1} \qquad (di)$$

in which n is an integer from 1 to 6, preferably from 3 to 5, in particular 3 or 4. Specific examples of suitable vinylfluoroalkanes are vinylperfluoromethane, vinylperfluoroethane, vinylperfluoro-n- or -isopropane, vinylperfluorobutane, vinylperfluoro-sec.-butane, vinylperfluoropentane and vinylperfluorohexane. The vinylfluoralkane (di) can be used alone or in a mixture.

Also suitable are mixtures of the appropriate vinylperfluoro-n- and -isoalkanes or technical-grade mixtures thereof. Blowing agents (d) which have proven particularly successful, and ones which are therefore preferred, are vinylperfluoroisopropane and vinylperfluorobutane.

Since the vinylfluoroalkane (di) which can be used according to the invention is, as stated above, only sparingly soluble or essentially insoluble, in the necessary amounts, in starting components (a), (b) and (c) or in a mixture of at least two of these starting components, it is preferably emulsified in one of the starting components (a), (b) and, if used, (c) or in a mixture of at least two of these. The vinylfluoroalkane or the mixture of vinylfluoroalkanes is usually used in an amount of from 1 to 40 parts by weight, preferably from 1 to 15 parts by weight, in particular from 2 to 10 parts by weight, based on 100 parts by weight of the starting components (a) and (b) or (a) to (c).

The vinylfluoroalkane (di) may be employed as the only blowing agent. However, the vinylfluoroalkane (di) or vinylfluoroalkane emulsion which can be used according to the invention can also be used in combination with other, physical, inert blowing agents or chemical blowing agents (dii) which are different from (di), or in combination with a mixture of physical and chemical blowing agents which are different from (di).

A suitable blowing agent mixture (d) for the production of the rigid foams containing urethane groups or urethane and isocyanurate groups by the process according to the invention can thus preferably contain or comprise di) at least one vinylfluoroalkane of the formula $$CH_2=CH-C_nF_{2n+1}$$

in which n is an integer from 1 to 6, in particular 3 or 4, or a mixture thereof, and dii) at least one further physical blowing agent which is different from (di) or a chemical blowing agent, or a mixture of such physical and chemical blowing agents.

Examples of suitable physical blowing agents are:

alkanes having 4 to 12 carbon atoms, preferably 5 to 8 carbon atoms, cycloalkanes having 4 to 6 carbon atoms, preferably 5 or 6 carbon atoms, linear or cyclic, saturated or olefinically unsaturated ethers having 2 to 5 carbon atoms, aliphatic carboxylic acid esters having a maximum boiling point of 142° C., preferably below 80° C., aliphatic and/or cycloaliphatic ketones having 3 to 5 carbon atoms, partially halogenated chlorofluorocarbons having 1 or 2 carbon atoms, partially fluorinated or preferably perfluorinated tertiary alkylamines having 3 to 9 carbon atoms, preferably 4 to 6 carbon atoms, partially fluorinated or perfluorinated, linear or cyclic ethers having 2 to 12 carbon atoms, preferably 3 to 6 carbon atoms, and preferably fluorinated or perfluorinated, advantageously aliphatic or cycloaliphatic hydrocarbons having 3 to 8 carbon atoms, preference being given to aliphatic or cycloaliphatic, fluorinated hydrocarbons having 4 to 6 carbon atoms which are liquid at room temperature and contain at least one bonded hydrogen atom, and aliphatic or cycloaliphatic, perfluorinated hydrocarbons having 4 to 7 carbon atoms.

Specific example of physical blowing agents (dii) of the said type are gaseous or preferably liquid, linear or branched alkanes, e.g. butane, n- and isopentane and technical-grade pentane mixtures, n- and isohexanes, n- and isoheptanes, n- and isooctanes, n- and isononanes, n- and isodecanes, n- and isoundecanes and n- and isododecanes. Since very good results with respect to the stability of the emulsions, the processing properties of the reaction mixture and the mechanical properties of the rigid foams containing urethane groups or urethane and isocyanurate groups are achieved when n-pentane, isopentane, n-hexane, or isohexane or a mixture thereof, is used, these alkanes are preferably employed. Furthermore, specific examples of cycloalkanes are cyclobutane, preferably cyclopentane, cyclohexane or mixtures thereof, specific examples of linear or cyclic ethers are dimethyl ether, diethyl ether, methyl ethyl ether, vinyl methyl ether, vinyl ethyl ether, divinyl ether, tetrahydrofuran and furan, specific examples of aliphatic carboxylic acid esters are methyl, ethyl, n-propyl, isopropyl and butyl acetate and preferably methyl and ethyl formate, specific examples of ketones are acetone, methyl ethyl ketone and cyclopentanone, specific examples of partially halogenated chlorofluorocarbons are difluoromonochloromethane (R 22), 1,1,1- trifluoro-2,2-dichloroethane (R 123) and 1,1,1-dichloromonofluoroethane (R 141b), specific examples of fluorinated or perfluorinated, tertiary alkylamines are perfluorodimethylethylamine, perfluorodiethylmethylamine, perfluorotrimethylamine, perfluorotriethylamine, perfluorodimethyl-n-propylamine, perfluorodiethyl-n-propylamine and preferably perfluorodimethylisopropylamine and the corresponding partially fluorinated tertiary alkylamines, specific examples of partially fluorinated or perfluorinated, linear or cyclic ethers are 2,2,2-trifluoroethyl methyl ether ($CF_3CH_2OCH_3$), 2,2,2-trifluoroethyl difluoromethyl ether ($CF_3CH_2OCHF_2$), perfluorodiethyl ether, perfluorodipropyl ether and perfluoroethyl propyl ether, oligomers of perfluoropropylene oxide having a maximum boiling point of 140° C., perfluorotetrahydrofuran, perfluoroalkyltetrahydrofurans and perfluorofuran. Aliphatic or cycloaliphatic, fluorinated or perfluorinated hydrocarbons which are gases at room temperature, e.g. perfluoropropane, perfluorobutane or perfluorocyclobutane, which can be liquefied under pressure, for example up to about 25 bar, mixed and emulsified are also highly suitable.

However, physical blowing agents (dii) which have proven eminently suitable and are therefore preferred are aliphatic or cycloaliphatic, fluorinated or perfluorinated hydrocarbons which are liquid at room temperature. The fluorinated hydrocarbons used are expediently those which are predominantly, for example at least 85%, fluorinated and contain at least one, preferably one, bonded hydrogen atom. Examples of suitable fluorinated hydrocarbons are trifluoromethane, difluoromethane, difluoroethane, tetrafluoroethane and preferably hexafluoropropane, heptafluoropropane, 1-H-perfluorobutane and 1-H-perfluorohexane. Examples of suitable perfluorinated hydrocarbons are perfluoropentane, perfluorohexane, perfluoroheptane, perfluorooctane, perfluorocyclopentane and perfluorocyclohexane. The fluorinated or perfluorinated hydrocarbons or mixtures thereof, like the other suitable physical blowing agents, can be employed individually or in the form of mixtures. It is also possible to use mixtures of the different physical blowing agents.

Examples of blowing agent mixtures of this type which may be mentioned are those which contain di) at least one vinylfluoroalkane from the group comprising vinylperfluoroisopropane and preferably vinylperfluoro-n-butane, and dii) at least one partially fluorinated hydrocarbon from the group comprising hexafluoropropane, heptafluoropropane, 1-H-perfluorobutane and 1-H-perfluorohexane, and/or at least one partially fluorinated ether from the group comprising 2,2,2-trifluoroethyl methyl ether and 2,2,2-trifluoroethyl difluoromethyl ether.

The blowing agent mixtures (d) which can be used according to the invention advantageously contain the vinylfluoroalkane (di) and the further physical blowing agent (dii), preferably the fluorinated and/or perfluorinated hydrocarbon, in a weight ratio of from 90:10 to 10:90, preferably from 80:20 to 60:40. If the other physical blowing agent (dii) is insoluble in the starting components (a), (b) and (c) in the necessary amounts, it is expediently emulsified in at least one of these starting components together with the vinylfluoroalkanes (di).

In addition to the vinylfluoroalkanes (di) which can be used according to the invention as blowing agent, or a mixture of (di) and another physical blowing agent (dii) which is different from (di), or in place of the physical blowing agent which is different from (di), it is also possible to use a chemical blowing agent. A particularly proven chemical blowing agent is water, which reacts with the organic, modified or unmodified polyisocyanate (a) to form carbon dioxide, the actual blowing agent and urea groups, and thus effects the compressive strength of the end products. Other suitable chemical blowing agents are organic mono- and polycarboxylic acids having a molecular weight of from 60 to 300 and preferably formic acid, and ammonium and/or amine salts of formic acid and/or of the abovementioned mono- and/or polycarboxylic acids, so long as these react with isocyanates under the reaction conditions and form carbon dioxide.

The organic carboxylic acids used are advantageously aliphatic mono- and polycarboxylic acids, e.g. dicarboxylic acids. However, other organic mono- and polycarboxylic acids are also suitable. The organic carboxylic acids may, if desired, also contain bonded substituents which are inert under the reaction conditions of the polyisocyanate polyaddition or are reactive with isocyanate, and/or may contain olefinically unsaturated groups. Specific examples of chemically inert substituents are halogen atoms, such as fluorine and/or chlorine, and alkyl, e.g. methyl or ethyl. The substituted organic carboxylic acids expediently contain at least one further group which is reactive toward isocyanates, e.g. a mercapto group, a primary and/or secondary amino group or preferably a primary and/or secondary hydroxyl group.

Suitable carboxylic acids are thus substituted or unsubstituted monocarboxylic acids, e.g. acetic acid, propionic acid, 2-chloropropionic acid, 3-chloropropionic acid, 2,2-dichloropropionic acid, hexanoic acid, 2-ethylhexanoic acid, cyclohexanecarboxylic acid, dodecanoic acid, palmitic acid, stearic acid, oleic acid, 3-mercaptopropionic acid, glycolic acid, 3-hydroxypropionic acid, lactic acid, ricinoleic acid, 2-aminopropionic acid, benzoic acid, 4-methylbenzoic acid, salicylic acid and anthranilic acid, and substituted or unsubstituted polycarboxylic acids, preferably dicarboxylic acids, e.g. oxalic acid, malonic acid, succinic acid, fumaric acid, maleic acid, glutaric acid, adipic acid, sebacic acid, dodecanedioic acid, tartaric acid, phthalic acid, isophthalic acid and citric acid.

The amine salts are usually formed using weakly basic amines, e.g. triethylamine, dimethylbenzylamine or hydrazine.

Since the amount of water present as a byproduct in the polyester- and polyether-polyols is frequently sufficient, there is frequently no need to add any further chemical blowing agent. However, water is preferably additionally introduced into the polyurethane formulation, usually in an amount of from 0.05 to 5% by weight, preferably from 0.5 to 4% by weight, based on the weight of starting components (a) to (c).

Suitable blowing agent mixtures (d) thus expediently contain, based on the total weight of (di) and (dii), di) at least 30% by weight, preferably at least 50% by weight, of at least one vinylfluoroalkane (di), and dii) a maximum of 70% by weight, preferably less than 50% by weight, of at least one further physical and/or chemical blowing agent (dii) which is different from (di).

Examples of blowing agent mixtures which may be mentioned contain
di) at least one vinylfluoroalkane from the group comprising vinylperfluoroisopropane and preferably vinylperfluoro-n-butane, and dii) water and, if desired, at least one partially fluorinated hydrocarbon from the group comprising hexafluoropropane, heptafluoropropane, 1-H-perfluorobutane and 1-H-perfluorohexane, and/or at least one partially fluorinated ether from the group comprising 2,2,2-trifluoroethyl methyl ether and 2,2,2-trifluoroethyl difluoromethyl ether.

The most expedient amount of vinylfluoroalkane (di) as blowing agent for the production of the rigid foams containing urethane groups or urethane and isocyanurate groups depends on the desired density and on whether any water is employed as the preferred chemical blowing agent. The necessary amount of blowing agent can easily be determined experimentally. In general, amounts of from 1 to 40 parts by weight, preferably from 1 to 15 parts by weight, in particular from 3 to 10 parts by weight, of the vinylfluoroalkane (di) or preferably of the blowing agent mixture comprising (di) and (dii), based on 100 parts by weight of the starting components (a) to (c) or (a) and (b), give satisfactory results.

The vinylfluoroalkane (di) of the formula $CH_2=CH-C_nF_{2n+1}$ which can be used according to the invention as the blowing agent (d), or the blowing agent mixture of a vinylfluoroalkane (di) and a further, physical and/or chemical blowing agent (dii) which is different from (di), is, for processing, preferably emulsified in the starting components (a), (b) and (c) or a mixture of (b) and (c) or in (a) and (b), the soluble physical or chemical blowing agent (dii) of the blowing agent mixture (d) dissolving homogeneously in the starting components.

The emulsifiers known from polyurethane chemistry are suitable for producing blowing agent-containing emulsions of this type. The emulsifiers employed are in particular oligomeric acrylates containing bonded polyoxyalkylene and fluoroalkane radicals as side groups and having a fluorine content of from approximately 5 to 30% by weight. Oligomeric acrylates of this type are sufficiently well known from polymer chemistry, for example as adhesion promoters in reinforced plastics, and further details are thus superfluous. Their structure and processes for their preparation, and suitable fluoroaliphatic radicals and precursors containing active hydrogen which can be used for the preparation of the oligomers described are described in detail, for example, in DE-B-23 10 357 and U.S. Pat. No. 3,787,351, which is equivalent thereto, and in the patents and literature cited therein, and in DE-A-38 24 355. The statements made in these publications, in particular in U.S. Pat. No. 3,787,351, are incorporated fully into the application description and are regarded as a constituent thereof.

The oligomeric acrylates containing polyoxyalkylene and fluoroalkane radicals as side groups which are suitable, for example, as emulsifiers are expediently employed in an amount of from 0.01 to 6 parts by weight, preferably from 0.2 to 3.5 parts by weight, in particular from 0.5 to 2.0 parts by weight, based on 100 parts by weight of the starting components (a), (b) and (c) or the mixture of (b) and (c).

Suitable compounds for the emulsification of the vinylfluoroalkane (di) or the blowing agent mixture comprising (di) and (dii) are, as stated above, the organic and/or modified organic polyisocyanate (a), the relatively high-molecular-weight compound containing at least two reactive hydrogen atoms (b) and the low-molecular-weight chain extender and/or crosslinking agent (c). Mixtures of (b) and low-molecular-weight chain extenders and/or crosslinking agents (c) are also suitable.

If an organic and/or modified organic polyisocyanate (a) is used as the other emulsion phase, preference is given to aromatic polyisocyanates selected from the group comprising 2,4- and 2,6-tolylene diisocyanates and mixtures of said isomers, 4,4,-, 2,4,- and 2,2,-diphenylmethane diisocyanates and mixtures of at least two of said isomers, and mixtures of diphenylmethane diisocyanates and polyphenyl-polymethylene polyisocyanates. If the organic polyisocyanates are crystalline at room temperature, they are liquefied by mixing with liquid polyisocyanates and/or by suitable partial modification, e.g. carbodiimidization and/or urethanization.

However, the other emulsion phase is preferably the relatively high-molecular-weight compound containing at least two reactive hydrogen atoms (b). Particularly suitable are polyester-polyols or mixtures thereof having a functionality of from 2 to 3 and a molecular weight of from 480 to 3000 and polyether-polyols or mixtures thereof having a functionality of from 2 to 6 and a molecular weight of from 400 to 8000, these expediently being selected from the group comprising the polyoxyethylene-, polyoxypropylene- and polyoxypropylene-polyoxyethylene-polyols and polyoxytetramethylene glycols, or mixtures thereof.

The blowing agent-containing emulsion according to the invention thus preferably contains or comprises at least one vinylfluoroalkane of the formula $CH_2=CH-C_nF_{2n+1}$ in which n is an integer from 1 to 6, (di), and at least one organic and/or modified organic polyisocyanate (a) or at least one relatively high-molecular-weight compound containing at least two reactive hydrogen atoms (b), or at least one low-molecular-weight chain extender and/or crosslinking agent (c), or a mixture of (b) and (c).

Particularly successful blowing agent-containing emulsions are those which comprise from 1 to 40 parts by weight, preferably from 2 to 15 parts by weight, based on 100 parts by weight of (b) or (b) and (c), of one or more vinylfluoroalkanes of the formula $CH_2=CH-C_nF_{2n+1}$ in which n is an integer from 1 to 6, (di), from 0 to 5 parts by weight, preferably from 1.5 to 3.5 parts by weight, based on 100 parts by weight of (b) or (b) and (c), of water, (dii), from 0 to 36 parts by weight, preferably from 1 to 7 parts by weight, based on 100 parts by weight, of (b) or (b) and (c), of at least one further physical blowing agent (dii) which is different from (di) and is only sparingly soluble or insoluble in the starting components (a), (b) and (c), preferably a fluorinated or perfluorinated organic compound (dii) which contains no bonded olefinically unsaturated groups in the molecule, and at least one relatively high-molecular-weight compound containing at least two reactive hydrogen atoms (b), or a mixture of (b) and a low-molecular-weight chain extender and/or crosslinking agent (c).

Particularly preferred emulsions are those of said type in which the vinylfluoroalkane (di) is vinylperfluoroisopropane and/or vinylperfluoro-n-butane.

To prepare the blowing agent-containing emulsions, the starting components (a), (b) or (c) or a mixture of (b) and (c) and the vinylfluoroalkane or vinylfluoroalkane-containing blowing agent mixture (d) is mixed vigorously, expediently in the presence of an emulsifier, preferably an oligomeric acrylate, at from 0° to 70° C., preferably from 20° to 40° C. Examples of suitable mixing units for this purpose are static mixers, e.g. an SMX from Sulzer (Switzerland), or dynamic mixers, e.g. propeller stirrers or Ultra-Turrax ® from Hanke und Kunkel (Germany).

The catalysts (e) used to produce the rigid PU or PU-PIR foams are, in particular, compounds which greatly accelerate the reaction of the hydroxyl-containing compound of the starting components (b) and, if used, (c) with the organic, modified or unmodified polyisocyanate (a). Examples of suitable compounds are organometallic compounds, preferably organotin compounds, such as tin(II) salts of organic carboxylic acids, e.g. tin(II) acetate tin(II) octanoate, tin(II) ethylhexanoate and tin(II) laurate, and dialkyltin(IV) salts of organic carboxylic acids, e.g. dibutyltin diacetate, dibutyltin dilaurate, dibutyltin maleate and dioctyltin diacetate, organic amidines, such as 2,3-dimethyl-3,4,5,6-tetrahydropyrimidine, tertiary amines, such as triethylamine, tributylamine, dimethylbenzylamine, N-methyl-, N-ethyl-, N-cyclohexylmorpholine, N,N,N',N'-tetramethylethylenediamine, N,N,N',N'-tetramethylbutanediamine, N,N,N',N'-tetramethyl-1,6-hexanediamine, pentamethyldiethylenetriamine, tetramethyldiaminoethyl ether, bis(dimethylaminopropyl)urea, dimethylpiperazine, 1,2-dimethylimidazole, 1-azabicyclo[3.3.0]octane and, preferably, 1,4-diazabicyclo[2.2.2]octane and alkanolamine compounds such as triethanolamine, triisopropanolamine, N-methyl and N-ethyldiethanolamine and dimethylethanolamine.

Other suitable catalysts are tris(dialkylaminoalkyl)-s-hexahydrotriazines, in particular tris(N,N-dimethylaminopropyl)-s-hexahydrotriazine, tetraalkylammonium hydroxides, such as tetramethylammonium hydroxide, alkali metal hydroxides, such as sodium hydroxide, and alkali metal alkoxides, such as sodium methoxide and potassium isopropoxide, and alkali metal salts of longchain fatty acids having from 10 to 20 carbon atoms and possibly containing lateral OH groups. From 0.001 to 5% by weight, in particular from 0.05 to 2% by weight, of catalyst or catalyst combination is preferably used, based on the weight of component (b). The organometallic compound and the highly basic amine, preferably tertiary amine, can in each case be employed as the only catalyst or in combination with one another.

If desired, assistants and/or additives (f) can be incorporated into the reaction mixture for the production of the rigid PU or PU-PIR foams. Specific examples are surfactants, foam stabilizers, cell regulators, fillers, dyes, pigments, flameproofing agents, hydrolysis-protection agents, and fungistatic and bacteriostatic substances.

Examples of suitable surfactants are compounds which serve to support homogenization of the starting materials and may also regulate the cell structure. Specific examples are emulsifiers, such as the sodium salts of castor oil sulfates, or of fatty acids and the salts of fatty acids with amines, for example diethylamine oleate, diethanolamine stearate and diethanolamine ricinoleate, salts of sulfonic acids, e.g. alkali metal salts or ammonium salts of dodecylbenzene- or dinaphthylmethanedisulfonic acid and ricinoleic acid; foam stabilizers, such as siloxane-oxyalkylene copolymers and other organopolysiloxanes, oxyethylated alkylphenols, oxyethylated fatty alcohols, paraffin oils, castor oil esters, ricinoleic acid esters, Turkey red oil and groundnut oil, and cell regulators, such as paraffins, fatty alcohols and dimethylpolysiloxanes. Suitable compounds for improving the emulsification action, the cell structure and/or stabilizing the foam are furthermore oligomeric polyacrylates containing polyoxyalkylene and fluoroalkane radicals as side groups. The surfactants are usually used in amounts of from 0.01 to 5 parts by weight, based on 100 parts by weight of component (b).

For the purposes of the invention, fillers, in particular reinforcing fillers, are conventional organic and inorganic fillers, reinforcing agents, wetting agents, agents for improving the abrasion behavior in paints, coating agents, etc. Specific examples are inorganic fillers, such as silicate minerals, for example phyllosilicates, such as antigorite, serpentine, hornblendes, amphiboles, chrysotile, and talc; metal oxides, such as kaolin, aluminum oxides, aluminum silicate, titanium oxides and iron oxides, metal salts, such as chalk, barytes and inorganic pigments, such as cadmium sulfide, zinc sulfide and glass particles. Examples of suitable organic fillers are carbon black, melamine, colophony, cyclopentadienyl resins and graft polymers.

The inorganic and organic fillers may be used individually or as mixtures and are advantageously introduced into the reaction mixture in amounts of from 0.5 to 50% by weight, preferably from 1 to 40% by weight, based on the weight of components (a) to (c).

Examples of suitable flameproofing agents are diphenyl cresyl phosphate, tricresyl phosphate, tris(2-chloroethyl) phosphate, tris(2-chloropropyl) phosphate, tris(1,3-dichloropropyl) phosphate, tris(2,3-dibromopropyl) phosphate, tetrakis(2-chloroethyl)ethylene diphosphate, dimethylmethane phosphonate, diethyl diethanolaminomethyl phosphonate and commercially available halogen-containing flameproofing polyols.

In addition to the abovementioned halogen-substituted phosphates, it is also possible to use inorganic flameproofing agents, such as red phosphorus, aluminum oxide hydrate, antimony trioxide, arsenic oxide, ammonium polyphosphate and calcium sulfate, or expandable graphite or cyanuric acid derivatives, e.g. melamine, or mixtures of two or more flameproofing agents, e.g. ammonium polyphosphates, expandable graphite and melamine, and, if desired, starch, in order to flameproof the rigid PU or PU-PIR foams produced according to the invention. In general, it has proven expedient to use from 5 to 50 parts by weight, preferably from 5 to 25 parts by weight, of said flameproofing agents or mixtures per 100 parts by weight of components (a) to (c).

Further details on the other conventional assistants and additives mentioned above can be obtained from the specialist literature, for example from the monograph by J. H. Saunders and K. C. Frisch, High Polymers, Volume XVI, Polyurethanes, Parts 1 and 2, Interscience Publishers 1962 and 1964 respectively, or Kunststoff-Handbuch, Polyurethane, Volume VII, CarlHanser-Verlag, Munich, Vienna, 1st and 2nd Editions, 1966 and 1983.

To produce the rigid PU foams, the organic, modified or unmodified polyisocyanate (a), the relatively high-molecular-weight compound containing at least two reactive hydrogen atoms (b) and, if used, the chain extender and/or crosslinking agent (c) are reacted in such amounts that the ratio between the number of equivalents of NCO groups in the polyisocyanate (a) and the total number of reactive hydrogen atoms in component (b) and, if used, (c) is from 0.85 to 1.25:1, preferably from 0.95 to 1.15:1, in particular from 1 to 1.05:1. If the rigid foam containing urethane groups is modified by formation of isocyanurate groups, for example in order to increase the flame resistance, it is usual to use an NCO:OH equivalent ratio of up to 60:1, preferably from 1.5 to 30:1, in particular from 1.5 to 8:1.

The rigid PU or PU-PIR foams can be produced batchwise or continuously by the prepolymer or preferably by the one-shot process using known mixing equipment.

It has proven particularly advantageous to use the two-component method and to combine the starting components (b), (d), (e) and, if used, (c) and (f) in component (A) and to use the organic or modified polyisocyanate (a) or a mixture of said polyisocyanates as component (B).

The starting components are mixed at from 15° to 90° C., preferably at from 20° to 65° C., in particular at from 20° to 35° C., and introduced into an open, heated or unheated mold, in which the reaction mixture is allowed to expand essentially without pressure in order to avoid a compacted peripheral zone. In order to produce PU or PU-PIR foam moldings, the partially filled mold is sealed, and the reaction mixture is expanded, usually with compaction, for example at a degree of compaction of from 1.2 to 8, preferably from 1.5 to 4, and allowed to cure. In order to form composite elements, the reverse side of an outer layer, is expediently coated, for example by pouring or spraying, with the foamable reaction mixture, which is allowed to expand and cured to form the rigid PU or PU-PIR foam.

The rigid PU or PU-PIR foams produced by the process according to the invention advantageously have a density of from 15 to 100 g/l, preferably from 28 to 60 g/l.

The rigid PU or PU-PIR foams are preferably used as a heat-insulating intermediate layer in composite elements and for foam-filling cavities in housings for refrigeration equipment, in particular for refrigerators and chest freezers, and as an outer jacket for hot-water storage tanks. The products are furthermore suitable for insulating warmed materials, as an engine cover and as pipe shells.

In the examples, parts are by weight.

EXAMPLE 1

Component A

To prepare the blowing agent-containing emulsion, 9 parts by weight of vinylperfluoro-n-butane were added with vigorous stirring using an Ultra Turrax ® at 23° C. to a mixture comprising 82 parts by weight of a polyoxypropylene-polyol having a hydroxyl number of 400, prepared from sucrose as the initiator molecule and 1,2-propylene oxide, 10 parts by weight of a polyoxypropylene glycol having a hydroxyl number of 105, prepared using 1,2-propanediol as the initiator molecule, 2 parts by weight of polysiloxane foam stabilizer (Tegostab ® B8406 from Goldschmidt AG, Essen), 2 parts by weight of N,N-dimethylcyclohexylamine and 4 parts by weight of water.

A milky emulsion of the vinylperfluoro-n-butane in the polyether-polyol mixture was obtained.

Component B

A mixture of diphenylmethane diisocyanates and polyphenyl-polymethylene polyisocyanates having an NCO content of 31% by weight (Lupranat ® M20S from BASF Aktiengesellschaft)

100 parts by weight of component A and
150 parts by weight of component B
were mixed with vigorous stirring at 23° C., and the foamable reaction mixture was introduced into an open, cuboid, metallic mold where it was allowed to expand freely.

A very fine-celled rigid PU foam having a mean pore diameter of 220 μm and a density of 27 g/l was obtained. The proportion of closed cells was 93% and the thermal conductivity was 19 mW/m K.

EXAMPLE 2

The procedure was similar to that of Example 1, but the foamable reaction mixture was introduced into an open, cuboid, metallic mold having a capacity of 8.5 l, and the mold was then closed.

256 g of the reaction mixture were required to foam-fill the mold completely. A molding having a minimum density of 30 g/l was obtained.

COMPARISON EXAMPLE 1

The procedure was similar to that of Example 1, but the vinylperfluoro-n-butane was replaced by 9 parts by weight of perfluoro-n-pentane as blowing agent.

The reaction mixture was foamed as described in Example 2. 340 g of the reaction mixture were required to completely foam-fill the cuboid mold cavity of 8.5 l.

A very fine-celled rigid polyurethane foam was again obtained, but its minimum molding density was 40 g/l.

EXAMPLE 3

The procedure was similar to that of Example 1, but the 4.0 parts by weight of water were replaced by just 0.5 part by weight of water and 10 parts by weight of vinylperfluoroisopropane. The mixing ratio between components A and B was 100:109.

A very fine-celled rigid PU foam having a mean pore diameter of 180 μm and a density of 86 g/l was obtained. The proportion of closed cells was 95% and the thermal conductivity was 19.5 mW/m K.

EXAMPLE 4

Component A

To prepare the blowing agent-containing emulsion,
3.8 parts by weight of vinylperfluoro-n-butane and
5.2 parts by weight of perfluorohexane
were added with vigorous stirring at 23° C. to a mixture comprising
82 parts by weight of a polyoxypropylene-polyol having a hydroxyl number of 400, prepared from sucrose as the initiator molecule and 1,2-propylene oxide,
10 parts by weight of a polyoxypropylene glycol having a hydroxyl number of 105, prepared using 1,2-propanediol as the initiator molecule,
2.5 parts by weight of a polysiloxane foam stabilizer (SR 321 from the PB Company),
2.0 parts by weight of N,N-dimethylcyclohexylamine and
3.6 parts by weight of water.

The resultant emulsion (component A) was mixed with the component B described in Example 1 in a weight ratio of 100:157 with vigorous stirring, and the reaction mixture was allowed to expand as described in Example 1.

A fine-filled rigid PU foam having a mean pore diameter of 273 μm and a density of 32 g/l was obtained. The proportion of closed cells was 95% and the thermal conductivity was 18.6 mW/m K.

EXAMPLE 5

The procedure was similar to that of Example 4, but a blowing agent mixture comprising
4.15 parts by weight of vinylperfluoro-n-butane and
4.85 parts by weight of perfluoropentane was used.

The mixing ratio between components A and B was 100:157.

A fine-celled rigid PU foam having a mean pore diameter of 241 μm and a density of 32 g/l was obtained. The proportion of closed cells was 94% and the thermal conductivity was 18.3 mW/m K.

EXAMPLE 6

The procedure was similar to that of Example 4, but a blowing agent mixture comprising
3.9 parts by weight of vinylperfluoro-n-butane and
5.1 parts by weight of 1H-perfluorohexane was used.

The mixing ratio between components A and B was 100:157.

A fine-celled rigid PU foam having a mean pore diameter of 420 μm and a density of 31 g/l was obtained. The proportion of closed cells was 93% and the thermal conductivity was 21 mW/m K.

EXAMPLE 7

Component A

To prepare the blowing agent containing emulsion,
9.0 parts by weight of vinylperfluoro-n-hexane were added with vigorous stirring at 23° C. to a mixture comprising
91.3 parts by weight of a polyoxypropylene-polyol having an OH number of 400, prepared from sucrose as the initiator molecule and 1,2-propylene oxide,
2.5 parts by weight of foam stabilizer (VPAC 3408 from Bayer AG),
2.0 parts by weight of N,N-dimethylcyclohexylamine and
4.2 parts by weight of water.

The resultant emulsion (component A) was mixed with the component B described in Example 1 in a weight ratio of 100:153 with vigorous stirring, and the reaction mixture was allowed to expand as described in Example 1.

A fine-celled rigid PU foam having a density of 29 g/l and containing 93% of closed cells was obtained. The thermal conductivity was 20.5 mW/m K.

EXAMPLE 8

The procedure was similar to that of Example 4, but a blowing agent mixture comprising
8.4 parts by weight of vinylperfluoro-n-butane and
4.6 parts by weight of 2,2,2-trifluoroethyl difluoromethyl ether
was used.

The resultant emulsion (component A) was mixed with the component B described in Example 1 in a weight ratio of 100:157 with vigorous stirring, and the reaction mixture was allowed to expand as described in Example 1.

A fine-celled rigid PU foam having a density of 28.8 g/l was obtained. The proportion of closed cells was 88% and the thermal conductivity was 19.5 mW/m K.

EXAMPLE 9

Component A

To prepare the blowing agent-containing emulsion, 8.6 parts by weight of vinylperfluoro-n-hexane and 1.8 parts by weight of n-pentane were added with vigorous stirring at 23° C. to 100 parts by weight of a mixture comprising
91.9 parts by weight of a polyoxypropylene-polyol having an OH number of 400, prepared from sucrose as the initiator molecule and 1,2-propylene oxide,
2.0 parts by weight of N,N-dimethylcyclohexylamine,
3.6 parts by weight of water and
2.5 parts by weight of a foam stabilizer (VPAC 3408 from Bayer AG).

The resultant emulsion (component A) was mixed with the component B described in Example 1 in a weight ratio of 100:142 with vigorous stirring, and the reaction mixture was allowed to expand as described in Example 1.

A fine-celled rigid PU foam having a density of 31.6 g/l was obtained. The proportion of closed cells was 91% and the thermal conductivity was 20.0 mW/m K.

EXAMPLE 10

The procedure was similar to that of Example 9, but a blowing agent mixture comprising
4.5 parts by weight of vinylperfluoro-n-butane and
4.5 parts by weight of oligomeric perfluoropropylene oxide (Galden ® HT 70 from Montedison)
was used.

The resultant emulsion (component A) was mixed with the component B described in Example 1 in a weight ratio of 100:144 with vigorous stirring, and the reaction mixture was allowed to expand as described in Example 1.

A fine-celled rigid PU foam having a density of 34.2 g/l was obtained. The proportion of closed cells was 92% and the thermal conductivity was 19.3 mW/m K.

EXAMPLE 11

The procedure was similar to that of Example 9, but a blowing agent mixture comprising
4.0 parts by weight of vinylperfluoro-n-butane and
2.5 parts by weight of 1,1,1-trifluoro-2,2-dichloroethane was used.

The resultant emulsion (component A) was mixed with the component B described in Example 1 in a weight ratio of 100:148 with vigorous stirring, and the reaction mixture was allowed to expand as described in Example 1.

A fine-celled rigid PU foam having a density of 29.5 g/l was obtained. The proportion of closed cells was 90% and the thermal conductivity was 19.8 mW/m K.

EXAMPLE 12

An emulsion of blowing agent is prepared by adding, with vigorous stirring, 10 parts by weight of vinylperfluoro-n-butane to a mixture of 93 parts by weight of tripropylene glycol,
2 parts by weight of amine catalyst (Polycat ® 8 from Abbott Laboratories),
1.5 parts by weight of silicone (Tegostab B 8409 from Goldschmidt AG.) and 3.5 parts by weight of water.

100 parts by weight of the emulsion thus obtained are reacted with 202 parts by weight of a polyisocyanate (Lupranat M205 from BASF AG.) consisting of a mixture of diphenylmethane diisocyanate and polyphunyl-polymerhylene polyisocyanates and having an NCO content of 31% by weight.

A rigid foam with a density of 34 g/l is obtained. The proportion of closed cells is 89% and this thermal conductivity of the foam is 21 mW/m K.

EXAMPLE 13

9 parts by weight of vinylperfluoroisopropane are stirred vigorously with a mixture of:
93 parts by weight of a polyoxypropylene polyol having a hydroxyl number of 410, obtained by addition of 1,2-propylene oxide to sucrose
2 parts by weight of amine catalyst (Polycat ® 8)
1 part by weight of silicone (Tegostab ® B8409) and
3.5 parts by weight of water.

By reacting 100 parts by weight of the resultant emulsion with 157 parts by weight of the same polyisocyanate (Lupranat M208) as in Example 1, a rigid foam is obtained with a density of 31 g/l and a thermal conductivity of 20 mW/m K.

EXAMPLE 14

An emulsion is obtained by stirring 7 parts by weight of vinylperfluoro-n-hexane with a mixture of 91.9 parts by weight of tripropylene glycol,
2 parts by weight of N,N,N',N'-tetramethylhexamethylenediamine,
2.5 parts by weight of a foam stabiliser (OS710 from Bayer AG) and
3.6 parts by weight of water.

By reacting 100 parts by weight of this emulsion with 181 parts by weight of the same polyisocyanate as in Example 1, a rigid foam with fine cells is obtained, which has a density of 34 g/l and a thermal conductivity of 19.5 mW/m K.

EXAMPLE 15

An emulsion is obtained by stirring 13.8 parts by weight of vinylperfluoro-n-butane and 1.1 parts by weight of cyclopentane with a mixture of
91.9 parts by weight of the same polyol as in Example 13,
2 parts by weight of Polycat ® 8 catalyst, 2.5 parts by weight of silicone (Tegostab ® B8406 from Goldschmidt AG) and
3.6 parts by weight of water.

By reacting 100 parts by weight of this emulsion with 150 parts by weight of the same polyisocyanate as in Example 1, a rigid foam with fine cells is obtained, with a density of 34 g/l. The proportion of closed cells is 94% and the thermal conductivity of the foam is 20.5 mW/m K.

EXAMPLE 16

An emulsion of blowing agent is prepared by stirring 10.5 parts by weight of vinylperfluoro-n-butane and 5.7 parts by weight of difluoromethyl 2,2,2-trifluoroethyl ether into a mixture of
92.4 parts by weight of dipropylene glycol,
3.6 parts by weight of water, 1.5 parts by weight of Polycat ® 8 catalyst and
2.5 parts by weight of OS 710 stabiliser.

By reacting 100 parts by weight of the resultant emulsion with 227 parts by weight of the same polyisocyanate as in Example 1, a foam with fine cells is obtained, which has a density of 33.6 g/l, a proportion of cloned cells of 89% and a thermal conductivity of 19.9 mW/m K.

EXAMPLE 17

An emulsion of blowing agent is prepared by stirring 8 parts by weight of vinylperfluoro-n-butane and 11 parts by weight of perfluorohexane into a mixture of:

46.1 parts by weight of a polyoxypropylene polyol having a hydroxyl number of 475 obtained by addition of 1,2-propylene oxide to sorbitol,
46 parts by weight of tripropylene glycol,
3.6 parts by weight of water,
1.8 parts by weight of Polycat ® 8 and
2.5 parts by weight of stabiliser Tegostab ® B 8406.

By reacting 100 parts by weight of this emulsion with 158 parts by weight of the same polyisocyanate as in Example 1, a foam with fine cells is obtained.

We claim:

1. A blown, closed-celled plastic foam containing in its cells a gaseous mixture comprising at least one vinylfluoroalkane of the formula $$CH_2=CH-C_nF_{2n+1}$$

in which $-C_nF_{2n+1}$ is linear or branched perfluoroalkyl and n is an integer from 1 to 6, as blowing agent and/or insulating gas, with the proviso that, if the vinylfluoroalkane is vinylperfluoro-n-butane, it is not employed in admixture with dichloroethylene or in admixture with more than 90% of 1,1-dichloro-1-fluoroethane.

2. A blown, closed-celled, rigid foam containing urethane groups and containing in its cells a gaseous mixture comprising at least one vinylfluoroalkane of the formula $$CH_2=CH-C_nF_{2n+1}$$

in which n is an integer from 1 to 6.

* * * * *